(12) United States Patent
Crawford et al.

(10) Patent No.: US 11,773,815 B2
(45) Date of Patent: Oct. 3, 2023

(54) CLOUD-ENABLED VEHICLE AUTOSTART MONITORING

(71) Applicant: The Chamberlain Group LLC, Oak Brook, IL (US)

(72) Inventors: Laura Crawford, Chicago, IL (US); Garth Wesley Hopkins, Lisle, IL (US); Oddy Khamharn, Lombard, IL (US); Edward James Lukas, Batavia, IL (US); Erich Struckmeyer, Barrington, IL (US); James Trainor, Chicago, IL (US)

(73) Assignee: The Chamberlain Group LLC, Oak Brook, IL (US)

( * ) Notice: Subject to any disclaimer, the term of this patent is extended or adjusted under 35 U.S.C. 154(b) by 0 days.

(21) Appl. No.: 17/666,778

(22) Filed: Feb. 8, 2022

(65) Prior Publication Data

US 2022/0154677 A1 May 19, 2022

Related U.S. Application Data

(63) Continuation of application No. 16/413,148, filed on May 15, 2019, now Pat. No. 11,248,576.
(Continued)

(51) Int. Cl.
*F02N 11/08* (2006.01)
*B60W 10/06* (2006.01)
(Continued)

(52) U.S. Cl.
CPC ......... *F02N 11/0837* (2013.01); *B60W 10/06* (2013.01); *E05F 15/668* (2015.01); *G06V 20/56* (2022.01); *E05Y 2900/106* (2013.01)

(58) Field of Classification Search
CPC .............. F02N 11/0837; F02N 11/10; F02N 2300/306; F02N 11/0807; B60W 10/06;
(Continued)

(56) References Cited

U.S. PATENT DOCUMENTS 6,091,330 A 7/2000 Swan
6,271,765 B1 8/2001 King
(Continued)

FOREIGN PATENT DOCUMENTS

CA 2555837 2/2008

OTHER PUBLICATIONS

Jackie Wattles; NYT: More than 2 dozen people killed by carbon monoxide after leaving on their keyless cars; CNNMONEY; 4 pages; May 14, 2018.
(Continued)

*Primary Examiner* — Sizo B Vilakazi
(74) *Attorney, Agent, or Firm* — Fitch, Even, Tabin & Flannery LLP

(57) ABSTRACT

In accordance with one aspect of the disclosure, an apparatus is provided that includes a database configured to store one or more vehicle status parameters of a vehicle and one or more secured space status parameters of a secured space. The apparatus further includes a server-based processor operatively coupled or connected to the database and configured to receive one or more of the one or more vehicle status parameters and one or more of the one or more secured space status parameters. The server-based processor is further configured to determine, based on at least one of the one or more vehicle status parameters and at least one of the one or more secured space status parameters whether to change a state of the vehicle.

29 Claims, 16 Drawing Sheets

Related U.S. Application Data

(60) Provisional application No. 62/674,601, filed on May 21, 2018.

(51) Int. Cl.
  *E05F 15/668* (2015.01)
  *G06V 20/56* (2022.01)

(58) Field of Classification Search
  CPC ........ E05F 15/668; E05F 15/77; G06V 20/56; G06V 20/52; E05Y 2900/106; E05Y 2400/30; E05Y 2400/40
  See application file for complete search history.

(56) References Cited

U.S. PATENT DOCUMENTS

| | | | |
|---|---|---|---|
| 6,563,431 | B1 | 5/2003 | Miller, Jr. |
| 6,615,132 | B1 | 9/2003 | Nagasaka |
| 6,911,898 | B2 | 6/2005 | Chung |
| 7,650,864 | B2 | 1/2010 | Hassan |
| 7,737,829 | B2 | 6/2010 | Nishiyama |
| 8,115,616 | B2 | 2/2012 | Gonzaga |
| 8,244,448 | B2 | 8/2012 | Newman |
| 8,375,913 | B2 | 2/2013 | Kwiecinski |
| 8,643,467 | B2 | 2/2014 | Chutorash |
| 8,878,646 | B2 | 11/2014 | Chutorash |
| 9,189,952 | B2 | 11/2015 | Chutorash |
| 9,230,378 | B2 | 1/2016 | Chutorash |
| 9,600,950 | B2 | 3/2017 | Chutorash |
| 9,836,905 | B2 | 12/2017 | Chutorash |
| 10,589,717 | B2 | 3/2020 | Cermak |
| 11,248,576 | B2 | 2/2022 | Crawford |
| 2010/0070128 | A1 | 3/2010 | Johnson |
| 2011/0030638 | A1* | 2/2011 | Newman ............... B60R 25/04 340/5.71 |
| 2011/0032115 | A1 | 2/2011 | Kwiecinski |
| 2013/0110376 | A1* | 5/2013 | Surnilla ............... F02D 41/042 180/65.28 |
| 2013/0268139 | A1 | 10/2013 | Endo |
| 2014/0149022 | A1 | 5/2014 | Geissenhoener |
| 2014/0277839 | A1* | 9/2014 | Flick ................... F02N 11/0807 701/2 |
| 2014/0343788 | A1 | 11/2014 | Hosey |
| 2015/0191164 | A1 | 7/2015 | Kinomura |
| 2015/0322911 | A1* | 11/2015 | Schweiger .......... F02N 11/0837 701/112 |
| 2016/0023660 | A1 | 1/2016 | Yu |
| 2016/0067809 | A1 | 3/2016 | Enyedy |
| 2016/0280224 | A1 | 9/2016 | Tatourian |
| 2017/0043767 | A1 | 2/2017 | Khafagy |
| 2017/0076597 | A1 | 3/2017 | Beattie, Jr. |
| 2017/0193789 | A1 | 7/2017 | Economy |
| 2017/0335781 | A1 | 11/2017 | Augusty |
| 2018/0061147 | A1 | 3/2018 | Bergmann |
| 2018/0126849 | A1* | 5/2018 | Kanagaraj ............... F02N 11/00 |
| 2018/0245393 | A1 | 8/2018 | Ozkan |
| 2018/0298865 | A1 | 10/2018 | Tamane |
| 2018/0345907 | A1 | 12/2018 | Tamane |
| 2018/0347532 | A1 | 12/2018 | Tamane |
| 2019/0176752 | A1 | 6/2019 | Cermak |
| 2019/0176801 | A1 | 6/2019 | Ruybal |
| 2019/0353130 | A1 | 11/2019 | Crawford |
| 2019/0359057 | A1* | 11/2019 | Kanagaraj ............. G06V 20/56 |
| 2022/0019810 | A1* | 1/2022 | Farber ..................... G07C 9/10 |

OTHER PUBLICATIONS

PCT Patent Application No. PCT/US2019/032684; International Search Report and Written Opinion dated Jul. 31, 2019, 9 pages.
U.S. Appl. No. 16/413,148; Office Action dated May 11, 2021; (pp. 1-11).
U.S. Appl. No. 16/413,148; Office Action dated Jun. 25, 2020, (pp. 1-13).
U.S. Appl. No. 16/413,148; Office Action dated Dec. 29, 2020; (pp. 1-15).
U.S. Appl. No. 16/413,148; Notice of Allowance and Fees Due (PTOL-85) dated Oct. 5, 2021; (pp. 1-8).
U.S. Appl. No. 16/413,148; Final Rejection dated Dec. 29, 2020; (pp. 1-15).

* cited by examiner

Single Layer Neural Expert System

Single Layer Neural Expert System

Multi-Layer Neural Expert System

CLOUD-ENABLED VEHICLE AUTOSTART MONITORING

CROSS-REFERENCE TO RELATED APPLICATIONS

This application is a continuation of U.S. patent application Ser. No. 16/413,148, filed May 15, 2019, entitled CLOUD-ENABLED VEHICLE AUTOSTART MONITORING, which claims the benefit of U.S. Provisional Patent Application No. 62/674,601, filed May 21, 2018, all of which are incorporated by reference herein in their entireties.

FIELD

This disclosure relates to a cloud-enabled movable barrier operator system and, specifically, to a cloud-enabled movable barrier operator system for monitoring and controlling auto-start of a vehicle in or proximate to a secured space controlled by the movable barrier operator.

BACKGROUND

A garage is a confined space and as automotive technology advances more and more vehicles are coming equipped with auto-start functionality. Auto-start functionality allows for remote starting of a vehicle, and many vehicles that have auto-start functionality have keyless ignitions. Because the user of a vehicle with auto-start functionality does not need to be in the vehicle to start the vehicle, or take the keys out of the ignition, the likelihood that noxious and potentially harmfully gases will fill the garage increases. For example, the user may forget the vehicle is running.

Electric vehicles are quiet, and users of electric vehicles often forget that they are running. Leaving electric vehicle running drains the vehicle's batteries and creates the potential for unwanted use of the vehicle. For example, a parent may accidently leave an electric vehicle running, increasing the risk that a child may operate the vehicle.

Improved control systems for auto-start and auto-shutoff of vehicles parked in or proximate to a secured space such as a garage are needed. A central problem in developing such a system is the development of appropriate data to enable modern control systems to decide when to start a vehicle, when to shut off a vehicle, and when to let a user make that choice. Moreover, modern controls systems must be designed in a way that is intuitive and easy to use for the user while minimizing the potential harm to users or their property.

The business model of a modern automotive manufacturer is becoming more service oriented. For example, Ford®, in addition to selling the consumer a vehicle, sells the consumer the service that comes along with the vehicle. The quality of that service is telling indicia of the quality of the auto manufacturer's brand, just like the quality of vehicle itself. As such, auto manufactures need reliable sources of data and reliable algorithms to implement decision based on that data that are intuitive and easy to use for the customer while minimizing the potential harm to customers or their property.

A system that addresses these concerns is described in detail below.

DETAILED DESCRIPTION

Figure 1:
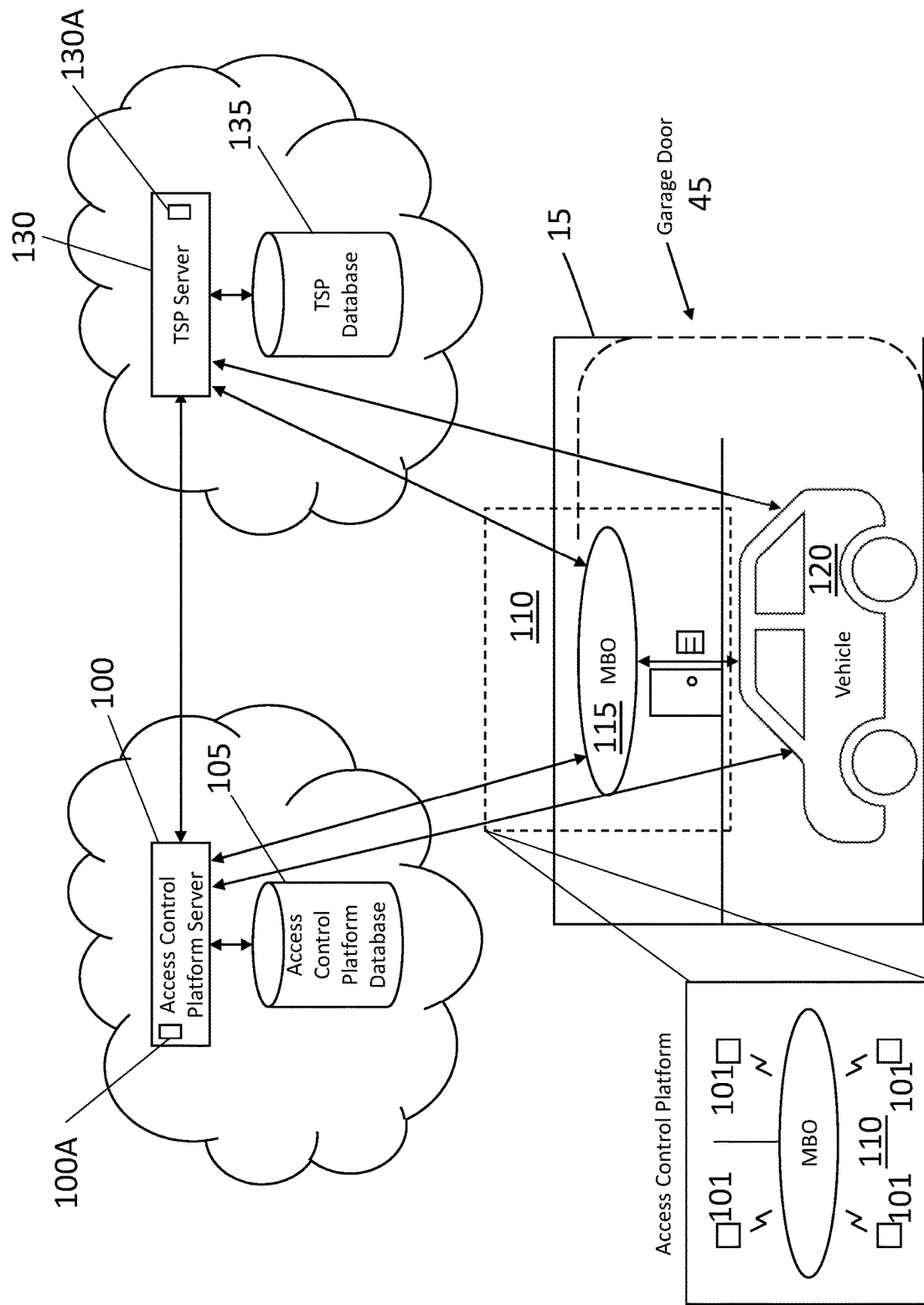
FIG. 1 illustrates a control system for determining when to change the state of a vehicle in or proximate to a secured space.

With reference to FIG. 1, an access control platform server 100 is connected to a telematics service provider ("TSP") server 130 and an access control platform 110. The TSP associated with the TSP server 130 may provide services such as roadside assistance, emergency response service, automatic crash response, infotainment service, and/or vehicle connectivity service as some examples. The access control platform server 100 may connect to the TSP server 130 and access control platform 110 over one or more networks such as the Internet. The access control platform server 100 may connect to the access control platform 110 through any or all of the access control devices 101 and/or the movable barrier operator 115. The access control platform 100 and the TSP server 130 may have computing resources, including processors 100A, 130A, located in the cloud.

Optionally, the access control platform server 100 may communicate directly with a vehicle 120, again, over one or more communications networks such as the Internet. The access control platform server 100 may be configured to send, receive, associate, determine, and cause to be stored one or more status parameters of a vehicle, such as vehicle 120, and/or an access control platform, such as access control platform 110. Additionally, the access control platform server 100 may be configured to send one or more commands to control when a vehicle, such as vehicle 120, is started and when the vehicle is shut off.

The access control platform 110 may include one or more access control devices 101, 115. For example, the access control platform 110 may include one or more access control devices such as movable barrier operator 115 and/or one or more locking mechanisms, such as access control devices 101, connected over a communications network such as the Internet. The access control devices 101, 115 of the access control platform 110 may also be networked to each other in a peer-to-peer ad hoc fashion using a short-range communication protocol such as Bluetooth® (or Bluetooth Low Energy (BLE), or Near Field Communications (NFC), or Wi-Fi) with at least one of the access control devices 101, 115 of the access control platform 110 being able to access a communications network such as the Internet.

The access control platform server 100 may be connected or coupled to an access control platform database 105 to store one or more status parameters of a vehicle, such as vehicle 120, or the secured space 15. The status parameters of the secured space 15 may be determined by an access control platform, such as access control platform 110. The access control platform database 105 may be, for example, a cloud storage or computing solution. The access control platform database 105 may be further configured to store one or more commands to control when a vehicle, such as vehicle 120, is started and when the vehicle is shut off.

The TSP server 130 may be configured to send, receive, associate, determine, and cause to be stored one or more status parameters of a vehicle, such as vehicle 120, or the secured space 15. The status parameters of the secured space 15 may be determined by an access control platform, such as access control platform 110. The TSP server 130 may connect to the access control platform 115 and/or the vehicle 120 over one or more networks such as the Internet. Additionally, the TSP server 130 may be further configured to send one or more commands to control when a vehicle, such as vehicle 120, is started and when it is shut off. The TSP server 130 may receive one or more status parameters or commands from the access control platform server 100, the access control platform 110, or the vehicle 120.

The TSP server 130 may be connected or coupled to a TSP database 135 to store one or more status parameters of a vehicle, such as vehicle 120, or the secured space 15. The status parameters of the secured space 15 may be determined by an access control platform, such as access control platform 110. The TSP database 135 may be, for example, a cloud storage solution. The TSP database 135 may be further configured to store one or more commands to control when a vehicle, such as vehicle 120, is started and when the vehicle is shut off.

Figure 14:
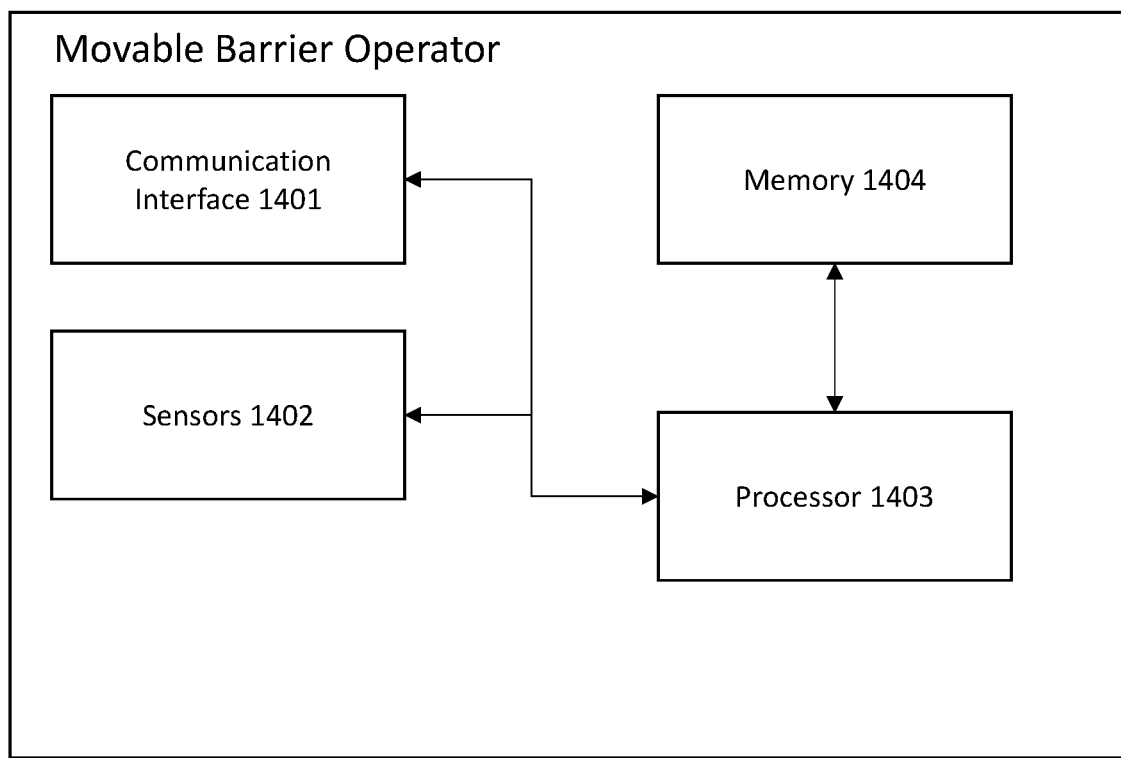
FIG. 14 illustrates a functional block diagram of a movable barrier operator.

The movable barrier operator 115 of the access control platform 110 may connect to the one or more access control devices 101, the access control platform server 100, the TSP server 130, and the vehicle 120 over one or more networks such as the Internet. The movable barrier operator 115 may also connect to the vehicle 120 and the one or more access control devices 101 using a short-range communication protocol such as Bluetooth® (or Bluetooth Low Energy (BLE), or Near Field Communications (NFC), or Wi-Fi). As illustrated in FIG. 14, the movable barrier operator 115 may include a processor 1403 coupled or connected to a memory 1404, a communication interface 1401, and one or more sensors 1402. The communication interface 1401 may be configured to send and receive status parameters or commands to and from the user device 310 (FIG. 3), one or more of the access control devices 101, the vehicle 120, the TSP server 130, or the access control platform server 100. The one or more sensors 1402, may include, for example, a camera, a microphone, one or more noxious gas detectors, and a photo eye. The one or more sensors 1402 may determine one or more of the status parameters of the secured space 15.

Figure 15:
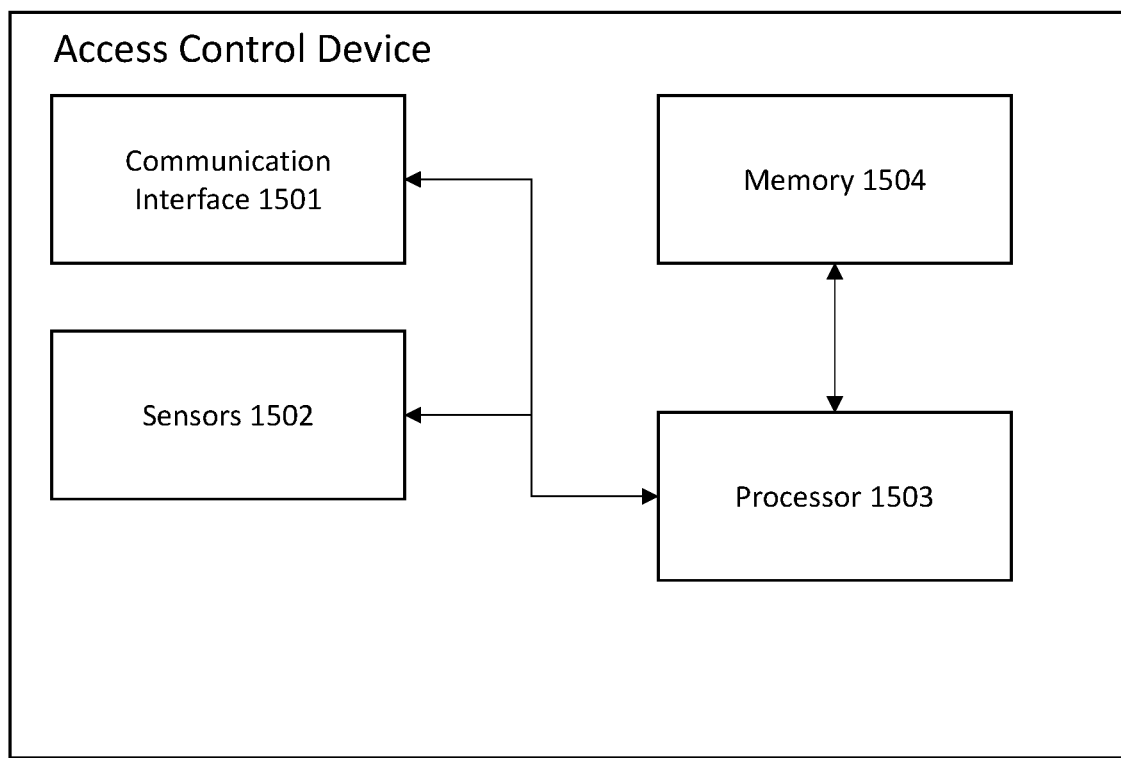
FIG. 15 illustrates a functional block diagram of a control device.

The one or more access control devices 101 of the access control platform 110 may connect to the movable barrier operator 115, the access control platform server 110, the TSP server 130, and the vehicle 120 over one or more networks such as the Internet. The one or more access control devices 101 may also connect to the vehicle 120 or the movable barrier operator 115 using a short-range communication protocol such as Bluetooth® (or Bluetooth Low Energy (BLE), or Near Field Communications (NFC), or Wi-Fi). As illustrated in FIG. 15, the one or more access control devices 101 may include a processor 1503 coupled or connected to a memory 1504, a communication interface 1501, and one or more sensors 1502. The communication interface 1501 may be configured to send and receive status parameters or commands to and from the user device 310 (FIG. 3), movable barrier operator 115, the vehicle 120, the TSP server 130, or the access control platform server 100. The one or more sensors 1502, may include, for example, an accelerometer, a gyroscope, a magnetometer, a camera, a microphone, one or more noxious gas detectors, and a photo eye. The one or more sensors 1502 may determine one or more of the status parameters of the secured space 15.

Access control platform 110 controls access to the secured space 15. The secure space 15 may be, for example, a garage or a home. For example, the movable barrier operator 115 of the access control platform 110 may be disposed in the secured space 15 and may be coupled to a movable barrier 45. The movable barrier operator 110 may be, for example, a garage door opener as illustrated in FIG. 1. The movable barrier operator 110 may be an operator such as a jackshaft operator, a swinging door operator, or a sliding gate operator. The movable barrier operator 110 may have, for example, a belt drive, a chain drive, or a screw drive. The movable barrier 45 may be a garage door that is configured to, for example, move along a track or pivot on a hinge. The access control platform 110 may also control access to a home by controlling the locking mechanism of one or more man doors via one or more of the access control devices 101. The state of a man door may be a status parameter of the secured space 15. For example, the one or more access control devices 101 may determine lock state and movement history of the man door and transmit them to the access control platform server 100 either directly or indirectly through, for example, the movable barrier operator 115.

Figure 6:
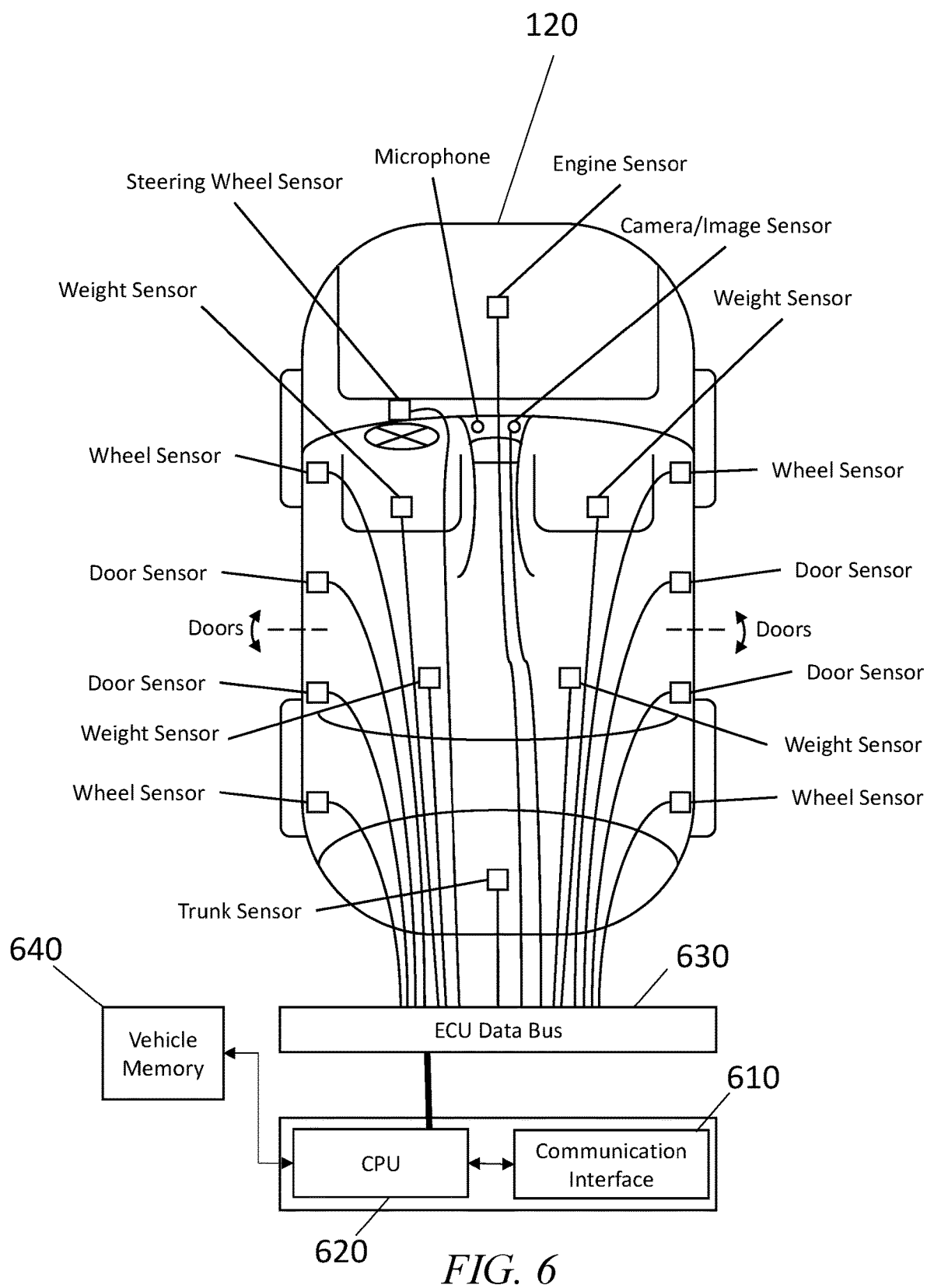
FIG. 6 illustrates a vehicle designed to interface with the control system.

The access control platform 110 may receive one or more signals from the vehicle 120 regarding the state of the vehicle 120. The one or more signals regarding the state of the vehicle 120 may be generated by one or more electronic control units (ECUs) (see FIG. 6) and communicated to a central processing unit 620 of the vehicle 120 through an ECU data bus 630. The central processing unit 620 may be configured to send and receive data, including the one or more data generated by the ECUs, to the access control platform 110, the access control platform server 100, the TSP server 130, and the user device 310. The access control platform 110, the access control platform server 100, the TSP server 130, and the user device 310 may communicate with the vehicle 120 through a central communication interface 610 of the vehicle 120 over one or more communication networks such as the Internet using any one or more various wireless communication protocols such as 3G, 4G, or 5G or it may communicate directly with any one of the individual ECUs to receive one or more signals regarding the state of the vehicle 120. The direct communication with the ECUs of the vehicle 120 and communication through a central communication interface 610 may also occur a short-range communication protocol such as Bluetooth® (or Bluetooth Low Energy (BLE), or Near Field Communications (NFC), or Wi-Fi. Communication directly with the one or more ECUs of the vehicle 120 improves system response time to commands, reduces data compression errors, and provides a more seamless user experience, whereas communication through the central interface is generally more secure.

The access control platform 110 may be networked or coupled to one or more peripheral devices such as images sensors, microphones, photo eyes, carbon monoxide or noxious gas detectors, weights sensors, charging devices, or other safety sensors or vehicle service devices. Furthermore, the access control platform 110 may determine status parameters of a secured space 15 from, for example, the peripheral devices. Status parameters may include an indication of whether the garage door is closed or open, an indication of whether, when, and how frequently a beam of a photo eye device was broken, or an indication that a vehicle has been recognized to be in the secured by space 15 by an image sensor coupled or connected to the access control platform 110.

The vehicle 120 may generate one or more signals via one or more ECUs to be sent to the access control platform 110, the access control platform server 100, or the TSP server 130. For example, the ECUs of the vehicle 120 may include a vehicle location ECU, such as a GPS module for determining the latitude, longitude, and elevation of a vehicle, and the vehicle location ECU may be capable of determining the heading, speed, velocity, and acceleration of the vehicle 120; an odometer ECU that may improve the location estimate of the vehicle 120 and similarly improve dead-reckoning calculation; a wheel pulse ECU for improving dead-reckoning calculations; a tachometer ECU; a wheel position ECU for determining wheel position; an accelerometer ECU; a gyroscope ECU; and a presence ECU for determining whether a driver or passenger is present in the vehicle. The presence ECU may include, for example, weight/pressure sensors, microphones, images sensors, and seat belt sensors for determining if the vehicle 120 is occupied. The vehicle 120 may include one or more of the ECUs discussed above.

The vehicle 120 may store one or more pieces of data to be sent to the access control platform 110, the access control platform server 100, or the TSP server 130. For example, the vehicle 120 may store an ignition state, vehicle identification number (VIN), key fob identifier data, braking information, blinker information, charge state, and data, obtained by, for example, vehicle to vehicle communication, indicating the presence of another vehicle proximate the vehicle 120. The vehicle 120 may also store historical records or data of any of the aforementioned or any other data collected by the ECUs or obtained by the vehicle. The vehicle 120 may also communicate with other vehicles to determine data regarding a state of the other vehicle upon receiving a command from the access control platform 110, the access control platform server 100, or the TSP server 130. Similarly, the vehicle 120 may transmit any data collected by any one of the one or more ECUs in real-time, at a fixed time interval, or after the size of data payload reaches a threshold amount to the access control platform 110, the access control platform server 100, or the TSP server 130 to be stored or processed.

The vehicle 120 may have an embedded or third-party application installed as a software module to facilitate communication from the vehicle 120 to the access control platform 110 and/or the access control platform server 100 to assist the vehicle in deciding when to start a vehicle, when to shut off a vehicle, and when to let a user make that choice. For example, a user of vehicle 120 may request remote start of the vehicle 120 from a device, such as device 310, configured to send a remote start signal to the vehicle 120. The device configured to send a remote start signal to the vehicle 120 may be, for example, a radio frequency transmitter such as a key fob, a mobile phone, or another computing system such as a home management system, and start may be requested by a radio broadcast, a short range wireless communication protocol such as Bluetooth®, or over one or more networks such as the Internet. In another option, the vehicle 120 may receive the command to start via a direct voice command. In the case that the start request is sent over the Internet, it may be received at the TSP server 130, and the TSP server 130 may send the start request to the access control platform server 100 to determine whether to start the vehicle 120.

Figure 2:
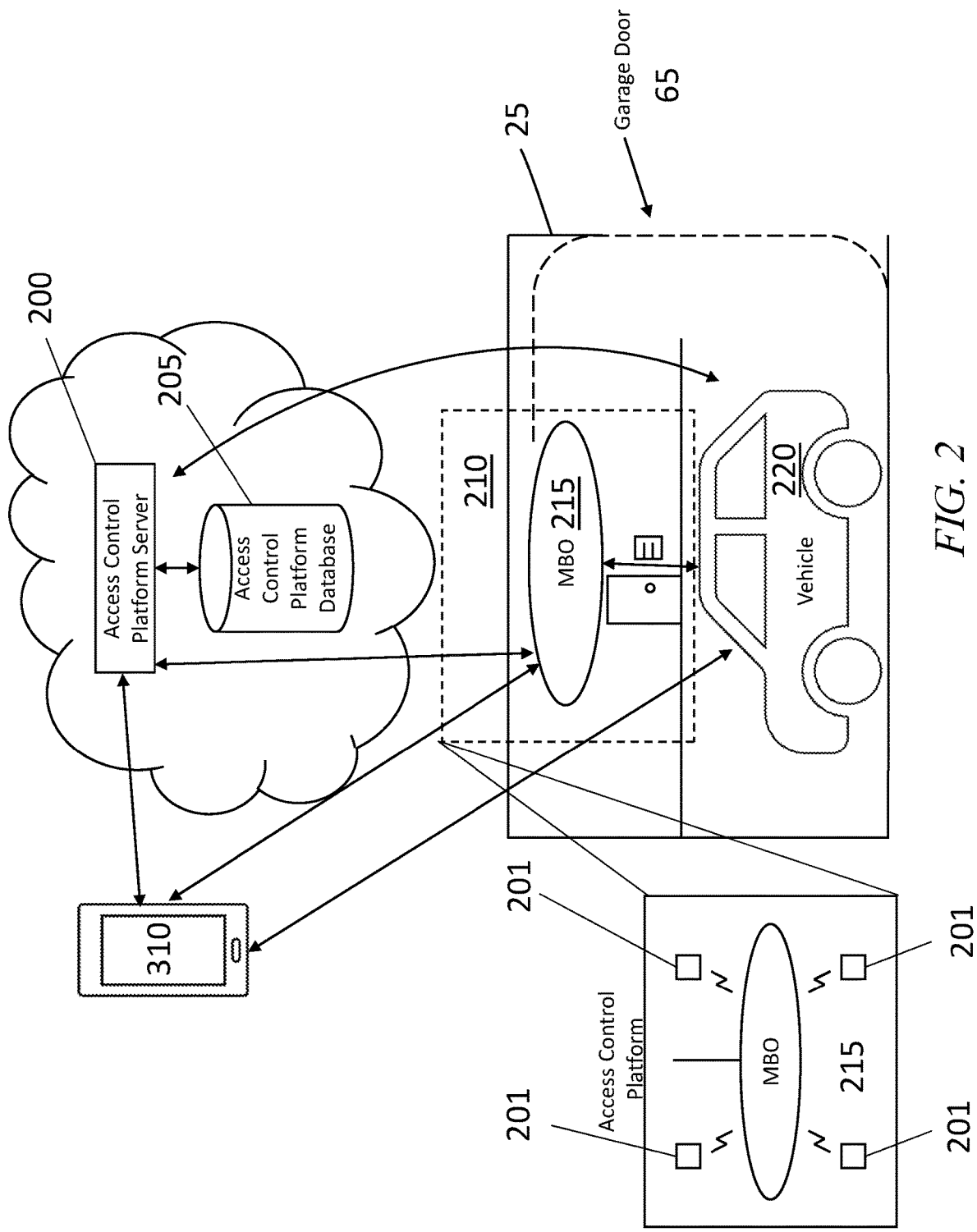
FIG. 2 illustrates a control system for determining when to change the state of a vehicle in or proximate to a secured space implemented entirely by a third-party vendor to the vehicle.

With reference to FIG. 2, a system is illustrated that is substantially the same as the system that is illustrated in FIG. 1 except that the device the user uses to request a vehicle, such as vehicle 220, to start communicates directly with the access control platform server 200. The movable barrier operator 215 is coupled to the access control platform 210 having one or more other access control devices 201. The movable barrier operator 215, the access control platform 210, and the one or more access control devices 201 perform the same or similar functions as like parts of the system of FIG. 1. The movable barrier operator 215 operates the movable barrier 65 to control access to the secure space 25 in the same or similar manner to like features of the system of FIG. 1.

Figure 3:
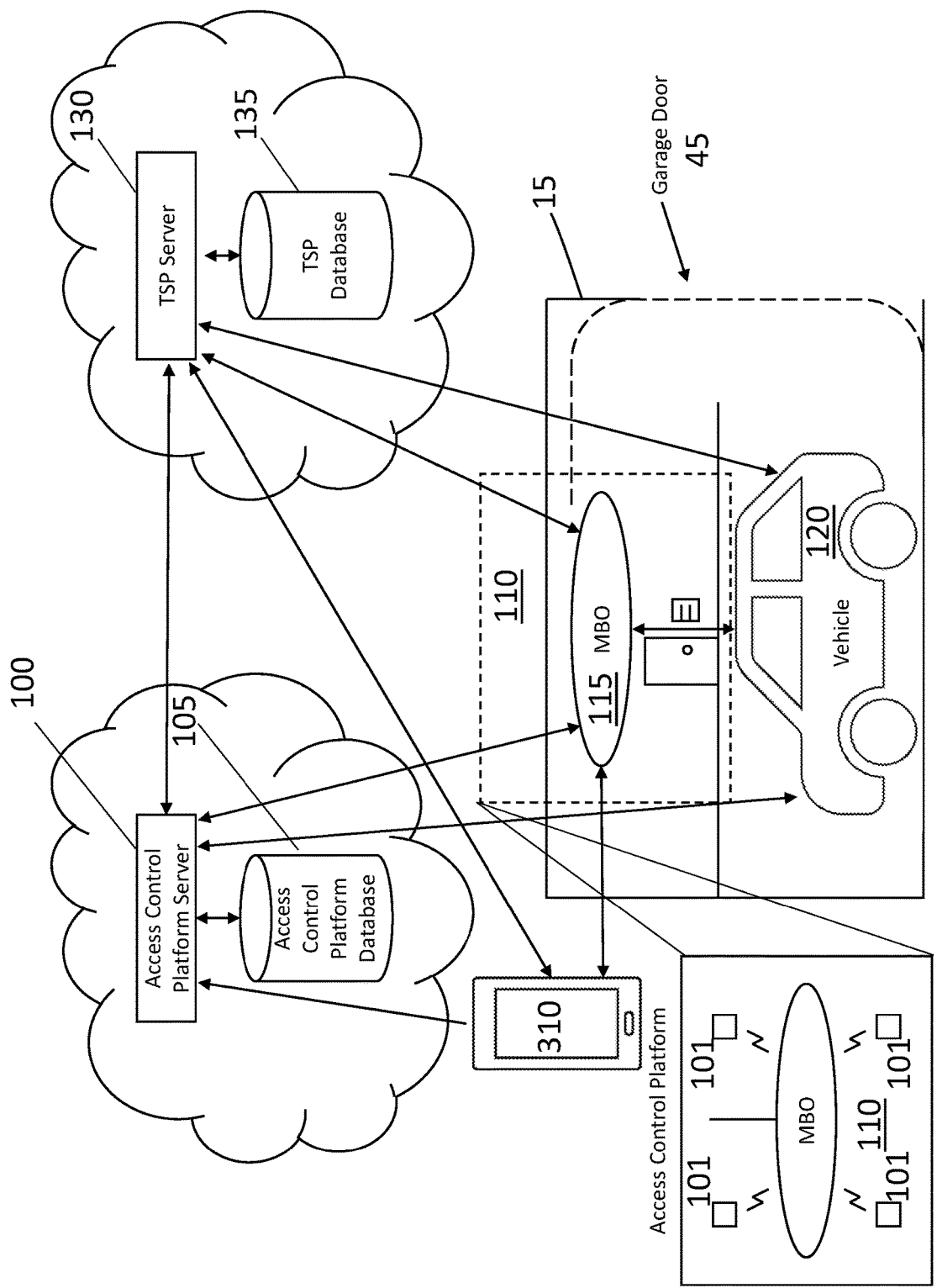
FIG. 3 illustrates the control system of FIG. 1 implemented as an authorized user in the loop control system.
Figure 4:
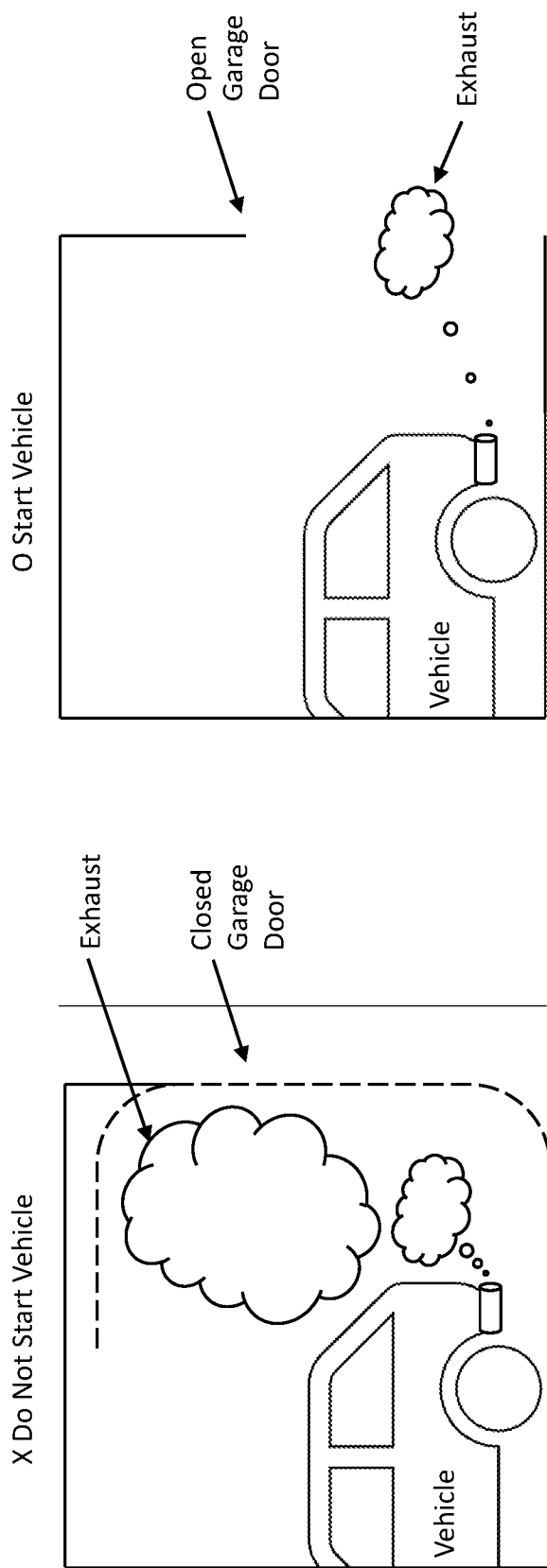
FIG. 4 diagrams conditions in which the control system should start a vehicle and conditions in which the control system should not start a vehicle

With reference to FIG. 3, the control system of FIG. 1 is illustrated as an authorized-user-in-the-loop control system. In the authorized-user-in-the-loop control system of FIG. 3 a user device 310 is coupled to one or more of the vehicles, such as vehicle 120, the access control platform 110, the TSP server 130, or the access control platform server 100. The user device 310 may be configured to send or receive one or more commands to control when a vehicle, such as vehicle 120, is started and when the vehicle is shut off. For example, a user may request that the vehicle 120 is started from the user device 310, the command may be received, by the vehicle 120, the access control server 100, the access control platform 110 or the TSP server 130. In the case that the start request is received by the vehicle 120, the access control platform 110, or the TSP server 130 the start request may be transmitted or relayed to the access control server 100 for further processing. The access control platform server 100 may then, in response to receiving the start request, determine whether or not the vehicle should be started based one or more status parameters of the secured space 15 or the vehicle 120. The access control platform server 100 may determine from the received status parameters that the vehicle is in the garage and the garage door is closed and, in response to that determination, determine that the vehicle 120 should not be started. Likewise, if the garage door is open the access control platform server 100 may determine that the vehicle 120 can be started, see FIG. 4.

Figure 16:
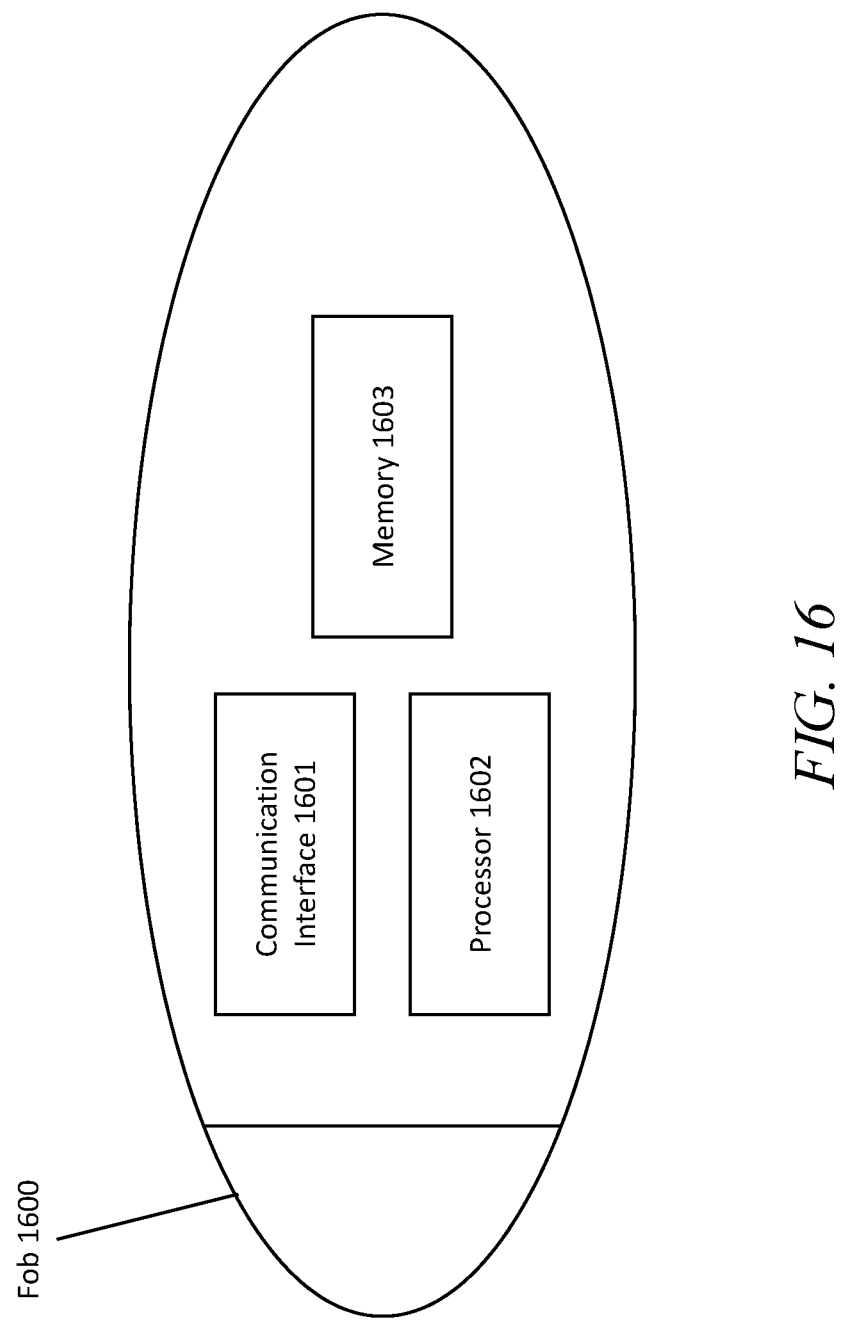
FIG. 16 illustrates a functional block diagram of a key fob device.

The user device 310 may be a smart phone, laptop, radio frequency transmitter such as a key fob 1600, another computing system such as a home management system, or any other device. In the case of the user device 310 that is not a key fob 1600 sending a start request, the start request may first be received by the key fob 1600, such as the key fob 1600 illustrated in FIG. 16, designed to grant access to the ignition system of the vehicle 120. A security token for starting the vehicle may be attached to the start request transmitted from the user device 310 by the user key fob 1600. The user key fob 1600 may then transmit the start request to the access control platform server 100 via the communication interface 610 (FIG. 6) of the vehicle 120 and/or one or more other devices such as the access control platform 110. Alternatively, the vehicle 120 will buffer the start request and wait for confirmation from the access control platform server 100 that the vehicle 120 should be or should not be started.

If the access control platform server 100 determines that the vehicle 120 should not be start based on one or more status parameters of the secured space 15 or the vehicle 120, the access control platform server 100 will not send a command to the access control platform 110, the vehicle 120, or the TSP server 130 to start the vehicle 120. In this case, the buffered start signal held by the vehicle 120 may expire, after a time, and be removed from the buffer. However, an override request may be sent to the user device 310. The override request may ask the user of the user device 310 if they would like to start the vehicle despite potential unsafe condition such as the garage door being closed. The override request may specify one or more reasons that the access control platform server 100 determined that the vehicle 120 should not be started. If the user responds to the override request before that start signal is cleared from the buffer by the central processing unit 610 of the vehicle 120, the vehicle 120 will be started if the user's response to the override requests indicates that the vehicle 120 should be started.

If the vehicle 120 is in or proximate to the secured space, the access control platform server 100 may monitor the vehicle 120 is real time to determine if the vehicle 120 should be turned off. For example, if a user starts the vehicle 120 and the vehicle 120 is left running for a period of time and there is no other indicator that the vehicle 120 is intended to be used, for example a user sitting in the seat of the vehicle, the access control server 100 may turn off the vehicle 120. The access control platform server 100 may process one or more status parameters of the secured space 15 and the vehicle 120 to determine if the vehicle 120 should be turned off. If the access control platform server 100 cannot determine whether the vehicle 120 should be shut off, a permission request may be sent to a user device, such as user device 310, requesting permission to shut off the vehicle 120. The permission request may specify one or more reasons the access control platform server 100 decided not to turn off the vehicle.

Figure 5:
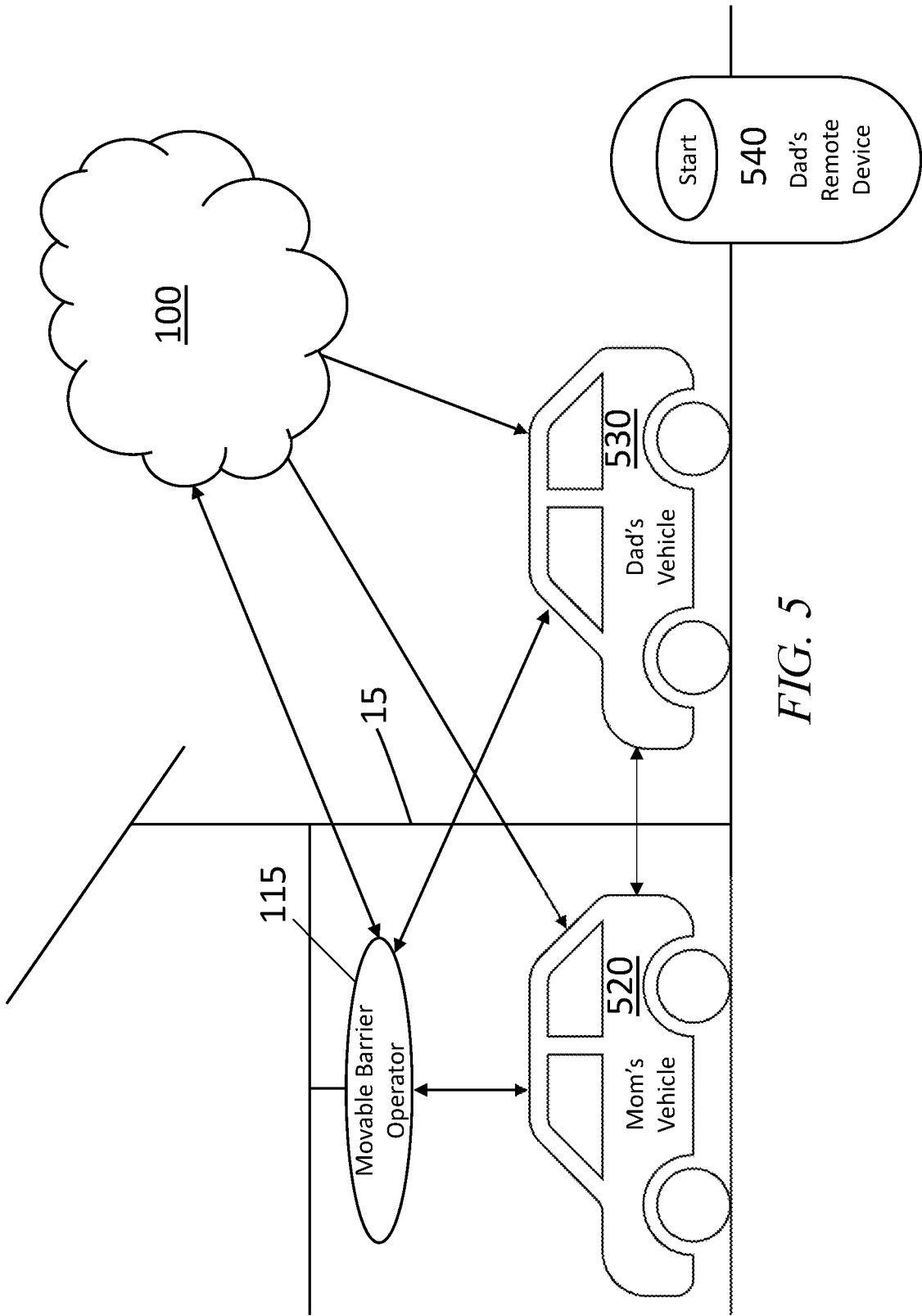
FIG. 5 illustrates a problem to be solved by the control system in which more than one vehicle is in or proximate to a secured space.

FIG. 5 illustrates a problem where more than one vehicle 520, 530 may be associated with an access control platform 110 and where more than one vehicle is in or proximate to the secured space 15. In this case, the access control platform will have to determine which of the vehicles 520, 530 is in the secured space 15 using one or more status parameters of the vehicle 520, 530 and one or more status parameters of the secured space 15. The status parameters of both the vehicles 520, 530 will be used to determine which of the vehicles 520, 530 is in the secured space 15 and which is not. For example, VIN, ambient light sensor data, or vehicle movement history data including data such as GPS, wheel sensor data, and steering wheel position data may be used to determine which of the vehicles 520, 530 is in the secured space 15 and which of the vehicles 520, 530 is not in the secured space 15. If the vehicle for which the user sent a start request for example, from user device 540, is not in the secured space 15, the vehicle will start; otherwise if the vehicle for which the user sent the start request is in the secured space 15, the access control platform 100 will determine whether the vehicle should start.

In one such implementation, the access control platform tracks the vehicle using multiple signals to determine location (such as GPS data, wheel pulse data, and the like) to learn what it means to be in someone's garage on a per vehicle basis. For example, person one always parks vehicle one in garage while person two's vehicle is just outside. We would see a higher confidence interval that person one's vehicle is in garage because 1) vehicle one's location is approximate to what has been set up as home, 2) vehicle one's distance traveled is within a certain amount of the door's opening, 3) time stamps are compared to see when vehicle one turned off compared to when a door is opened, a beam of a photo eye device was broken, and the door is closed, 4) wheel pulse data is consulted to count the number of clicks to supplement GPS data to help location determination. If person two parks outside the garage but gets inside the house via the garage, the system will see that: 1) location is approximately by garage, 2) vehicle two was shut off before garage door opened, 3) a beam of a photo eye device was broken in a pattern not consistent with a vehicle passing through, 4) wheel clicks do not include the extra amount usually detected when vehicle is in right location, slowing down. Using GDO data or Wifi data, the system could understand if multiple users use the same garage and live in the same household. The users' data could then be compared to improve confidence in the determinations.

The access control platform 110 may employ one or more confidence algorithms to determine whether the vehicle 120 should be started in response to the start request from the user. The confidence algorithm may be embodied as a neural system. For example, the confidence algorithm may be implemented as a single layer neural expert system (see FIGS. 8, 9), a multilayer neural expert system (see FIGS. 10, 11), or a neuro-fuzzy system (see FIGS. 12, 13). Though not illustrated the confidence algorithm may be implemented as a neuro-fuzzy adaptive network or a neural adaptive network. The one or more confidence algorithms may have one or more processes under control. For example, it is contemplated that the processes under control may be the starting of the vehicle 120 and the turning off of the vehicle 120. The algorithms including the one or more processes under control can be implemented without the use of a confidence algorithm.

The neural system controlling the process of starting the vehicle 120 may decide whether to start the vehicle 120, let the user decide whether to start the vehicle 120, or decide not to start the vehicle 120. For example, if in response to an initial user request to start the vehicle 120 from a remote device, such as user device 310, the neural system may determine that it is not confident that the vehicle should be started. In this case, the vehicle will not start and an override request may be sent to the remote device asking the user whether the vehicle 120 should be started regardless. The override request may indicate one or more reasons the confidence algorithm decided not to start the vehicle 120. The override request may further allow the user to indicate which of the reasons are true and which of the reasons are false. The user's response to the override request may be used to train or tune the confidence algorithm. In one example of this case, the TSP prompts the user with the override request, and data is returned as to whether the user engaged, which can be used to fine tune the algorithm. By responding to the override request, the user creates an override response.

Figure 7:
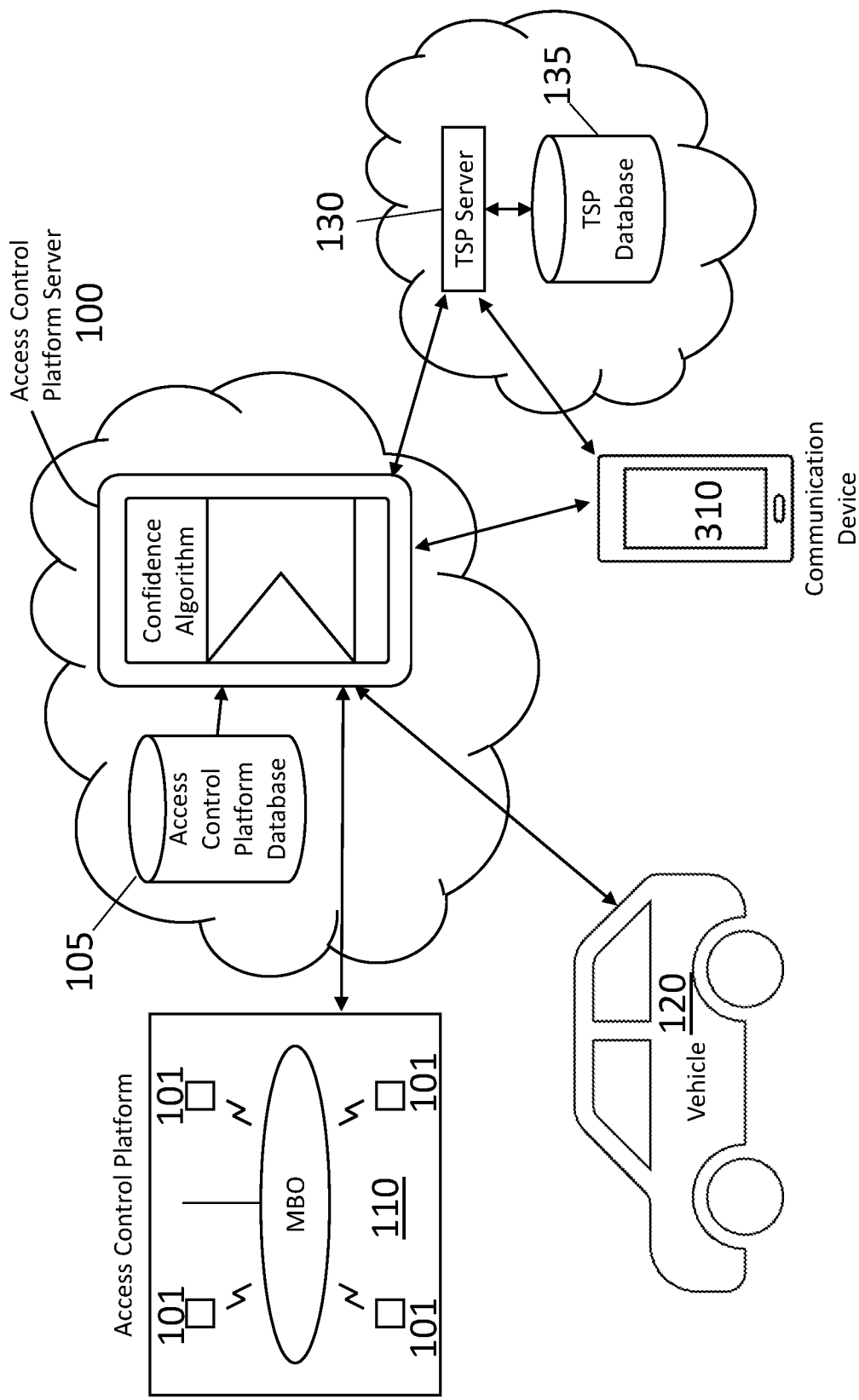
FIG. 7 illustrates the control system of FIG. 3 having a confidence algorithm for determining when to change the state of a vehicle.

The confidence algorithm may be executed by the access control platform server 100, as illustrated in FIG. 7. However, the confidence algorithm may also be executed on the TSP server, by the access control platform 110, or the vehicle 120. In one example, the access control platform server may send a confidence level that the vehicle 120 is parked in a garage to the TSP server or vehicle, which will then determine whether the vehicle 120 is allowed to start.

The neural systems controlling the process of turning off the vehicle 120 will decide whether to turn off the vehicle 120, let the user decide whether to turn off the vehicle 120, or decide not to turn off the vehicle 120. For example, if in response to one or more status parameters of the vehicle 120 or the secure space 15 that indicate that a vehicle should be shut off, the confidence algorithm is not confident that the vehicle 120 should be shut off, a permission request may be sent to a remote device, such as user device 310, asking the user whether not the vehicle may be shut off. The permission request may indicate one or more reasons the confidence algorithm decided not to shut off the vehicle 120. The permission request may further allow the user to indicate which of the reasons are true and which of the reasons are false. The user's response to the override request may be used to train or tune the confidence algorithm. By responding the permission request, the user creates a permission response.

In the case of the confidence algorithm being implemented as a neural expert system the confidence algorithm will send the override request if a fuzzy inference of the neural expert system indicates that the user should decide whether or not to start the vehicle 120. Similarly, the neural expert system may, in one embodiment, send the override request if the inequality of equation (1), below, is false.

$$\sum_{i=1}^{n} x_i w_i > \sum_{j=1}^{n} |w_j|$$

If the inequality of equation (1) above is false no fuzzy inference can be made by the neural expert system for a particular neuron for which the inequality is false. Equation (1) stands for the fact that that the confidence system embodied as a neural expert system cannot infer whether a particular action should execute unless that the sum of the net weighted input to the neuron is greater than the sum of the absolute value of the weights of the unknown inputs. The variable $x_i$ in the equation above represents the value of an input to the neural expert system and the variable $w_1$ is the weight corresponding to a given input, $x_i$. The variable $w_j$ represents the weight of an unknown input.

Figure 8:
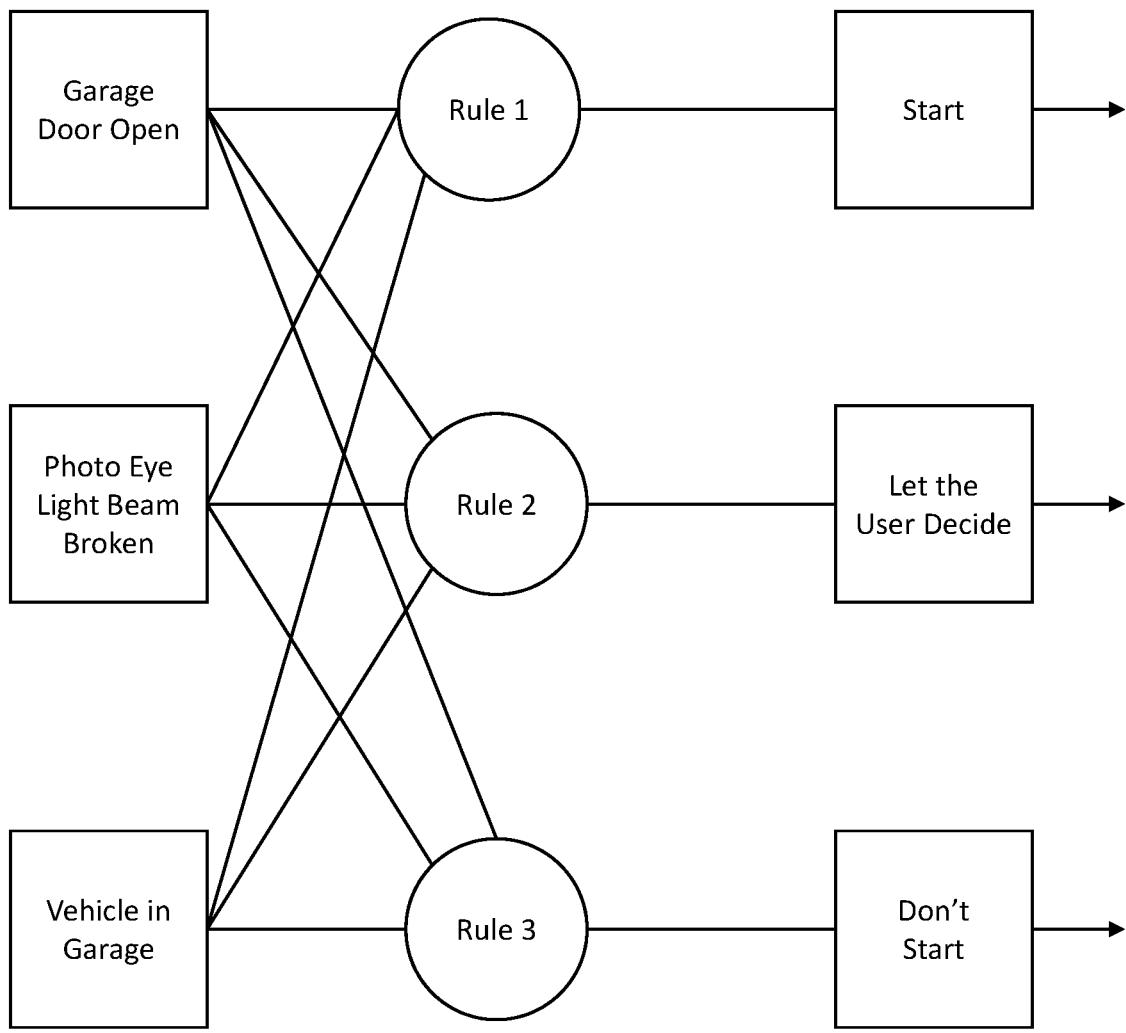
FIG. 8 illustrates the confidence algorithm embodied as a single layer neural expert system having a start process under control.
Figure 10:
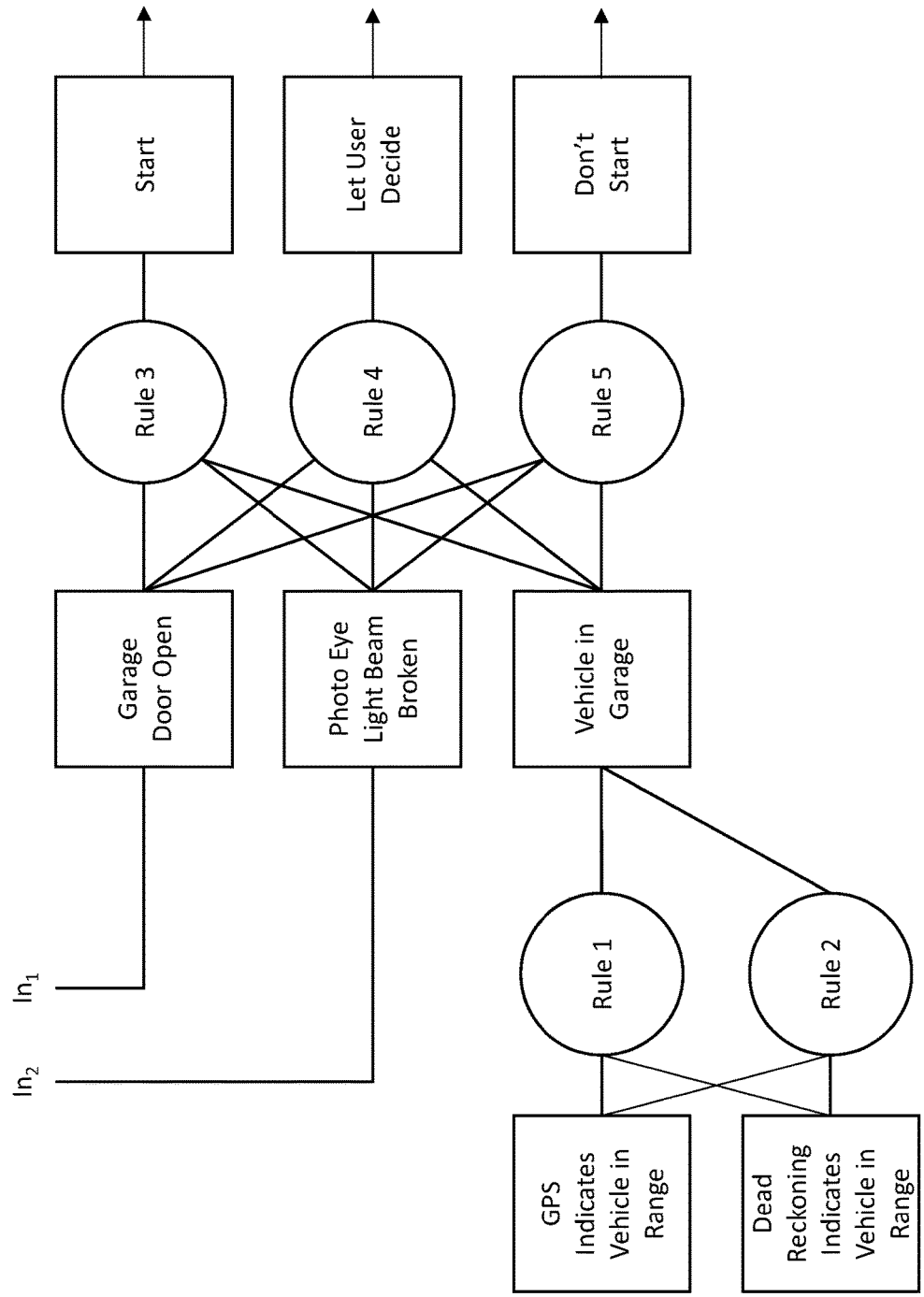
FIG. 10 illustrates the confidence algorithm embodied as a multi-layer neural expert system having a start process under control.

The confidence algorithm embodied as one or more neural expert systems may have one or more processes under control. For example, the confidence algorithm may have a neural expert system for controlling the process of starting a vehicle as illustrated in FIGS. 8 and 10. In the single layer neural expert system of FIG. 8 and the multi-layer neural expert system of FIG. 10, the neural expert systems are illustrated as having three inputs: the state of the garage door, for example whether or not the garage door is open; the state of the photo eye, for example whether or not a light beam of a photo eye was broken; and the state of a vehicle, for example one or more vehicle status parameters may indicate that a vehicle is in the garage. FIG. 10 illustrates a multi-layer neural expert system that uses the data of GPS sensors and dead reckoning techniques utilizing vehicle status parameters such as wheel turns and secure space status parameters such as the breaking of a light beam of a photo eye to determine whether the vehicle 120 is in the secure space 15.

Figure 9:
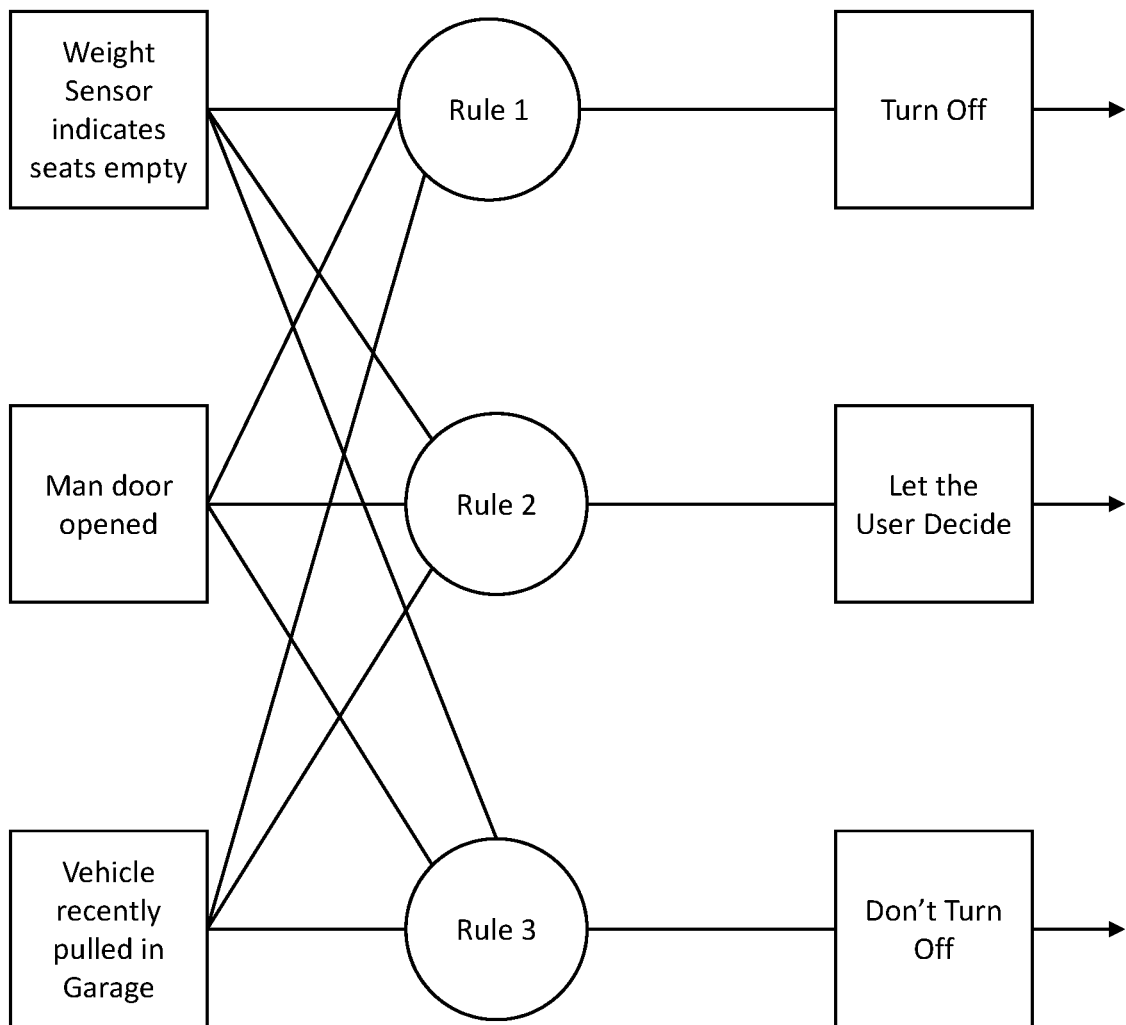
FIG. 9 illustrates the confidence algorithm embodied as a single layer neural expert system having a turn off process under control.
Figure 11:
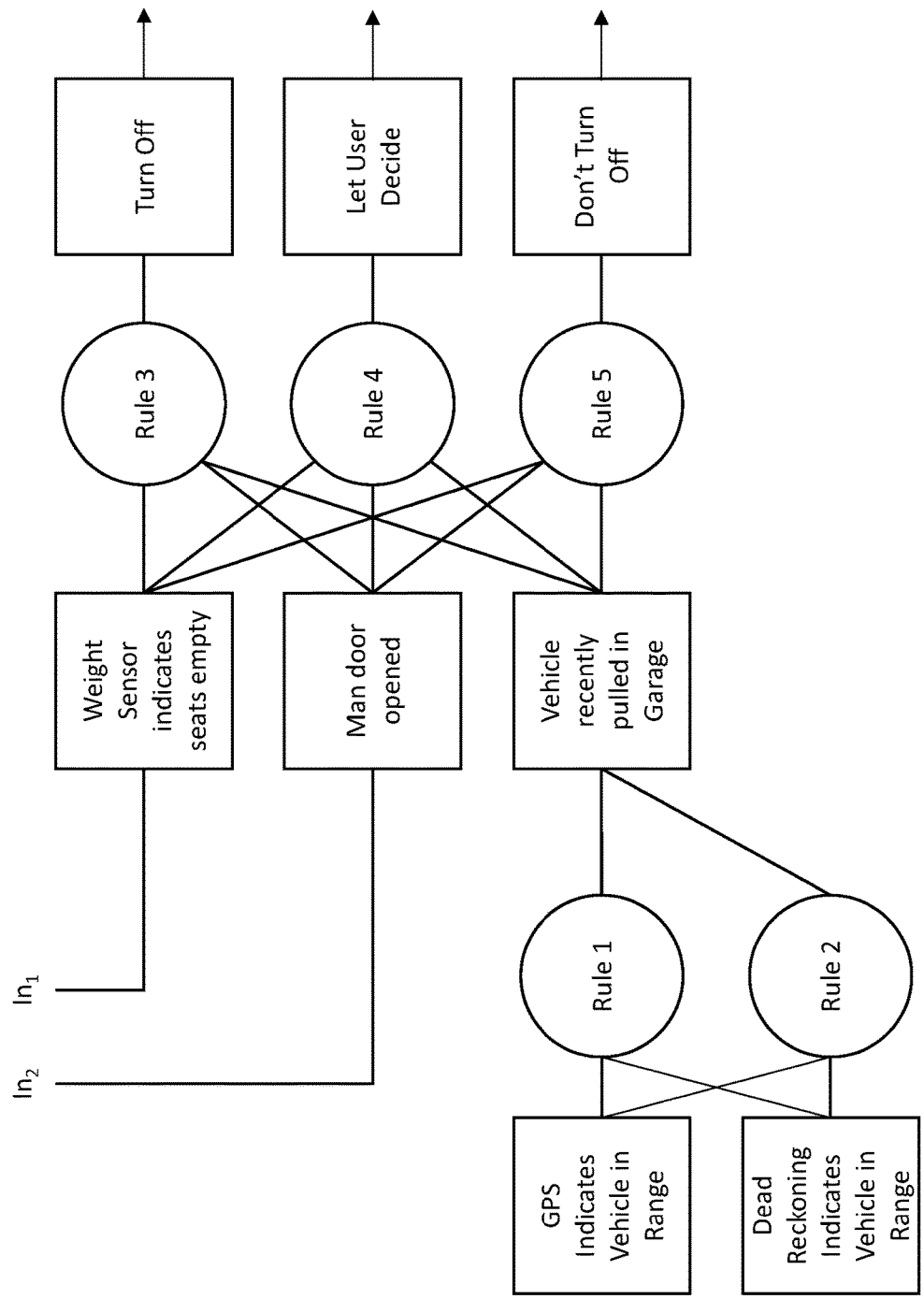
FIG. 11 illustrates the confidence algorithm embodied as a multi-layer neural expert system having a turn off process under control.

The confidence algorithm may have a neural expert system for controlling the process of turning off a vehicle as illustrated in FIGS. 9 and 11. In the single layer neural expert system of FIG. 9 and the multi-layer neural expert system of FIG. 11, the neural expert systems are illustrated as having three inputs: the state of the weight sensor, for example the weight sensor may indicate that a seat is empty; the state of a man door, for example one or more sensors may indicate that a man door has been opened; and the state of a vehicle, for example one or more vehicle status parameters may indicate that a vehicle is in the garage. FIG. 10 illustrates a multi-layer neural expert system that uses the data of GPS sensors and dead reckoning techniques utilizing vehicle status parameters such as wheel turns and secure space status parameters such as the breaking of a light beam of a photo eye to determine whether the vehicle 120 is in the secure space 15.

The embodiments of FIGS. 8-11 are only examples, the systems may have more or less inputs, more or less rules, and more or less outputs. Similarly, the systems may consist of as few or as many layers are necessary to control a process of starting a vehicle or a process of shutting off a vehicle.

In the case of the confidence algorithm being implemented as a neuro-fuzzy system controlling the process starting a vehicle (FIG. 12), the output of the neuro-fuzzy system may be, for example, a single probability value, x. As such, the determination of whether to start the vehicle 120, to ask the user whether the vehicle should be started, or to not start the vehicle may be determined by a conditional argument such as the conditional argument below:

$$\text{if } \begin{cases} x \geq 70\%, \text{ start the vehicle} \\ x < 70\% \text{ and } x \geq 40\%, \text{ let the user decide} \\ x < 40\%, \text{ do not start the vehicle} \end{cases}$$

If the confidence algorithm implemented as a neuro-fuzzy system determines that the user should decide whether or not to start the vehicle 120, the access control platform server 100 may send an override request to the user device 310. The override request may indicate one or more reasons the confidence algorithm decided not to start the vehicle 120. The override request may further allow the user to indicate which of the reasons are true and which of the reasons are false. The user's response to the override request may be used to train or tune the confidence algorithm using techniques such as backpropagation. Both the probability value x and the ranges of the conditional argument may be adjusted. For example, the confidence algorithm may feed-forward probability value x or an error value determined from the probability value x to adjust the ranges of the conditional argument prior to making a determination based on the conditional argument.

In the case of the confidence algorithm being implemented as a neuro-fuzzy system controlling the process shutting off a vehicle (FIG. 13), the output of the neuro-fuzzy system may be, for example, a single probability value, x. As such, the determination of whether to shut off the vehicle 120, to ask the user whether the vehicle should be shut off, or to not shut off the vehicle may be determined by a conditional argument such as the conditional argument below:

$$\text{if } \begin{cases} x \geq 70\%, \text{ shut off the vehicle} \\ x < 70\% \text{ and } x \geq 40\%, \text{ let the user decide} \\ x < 40\%, \text{ do not shut off the vehicle} \end{cases}$$

If the confidence algorithm implemented as a neuro-fuzzy system determines that the user should decide whether to shut off the vehicle 120, the access control platform server 100 may send a permission request to the user device 310. The permission request may indicate one or more reasons the confidence algorithm decided to shut off the vehicle 120. The permission request may further allow the user to indicate which of the reasons are true and which of the reasons are false. The user's response to the permission request may be used to train or tune the confidence algorithm using techniques such as backpropagation. Both the probability value x and the ranges of the conditional argument may be adjusted. For example, the system may feedforward probability value x or an error value determined from the probability value x to adjust the ranges of the conditional argument prior to making a determination based on the conditional argument.

Figure 12:
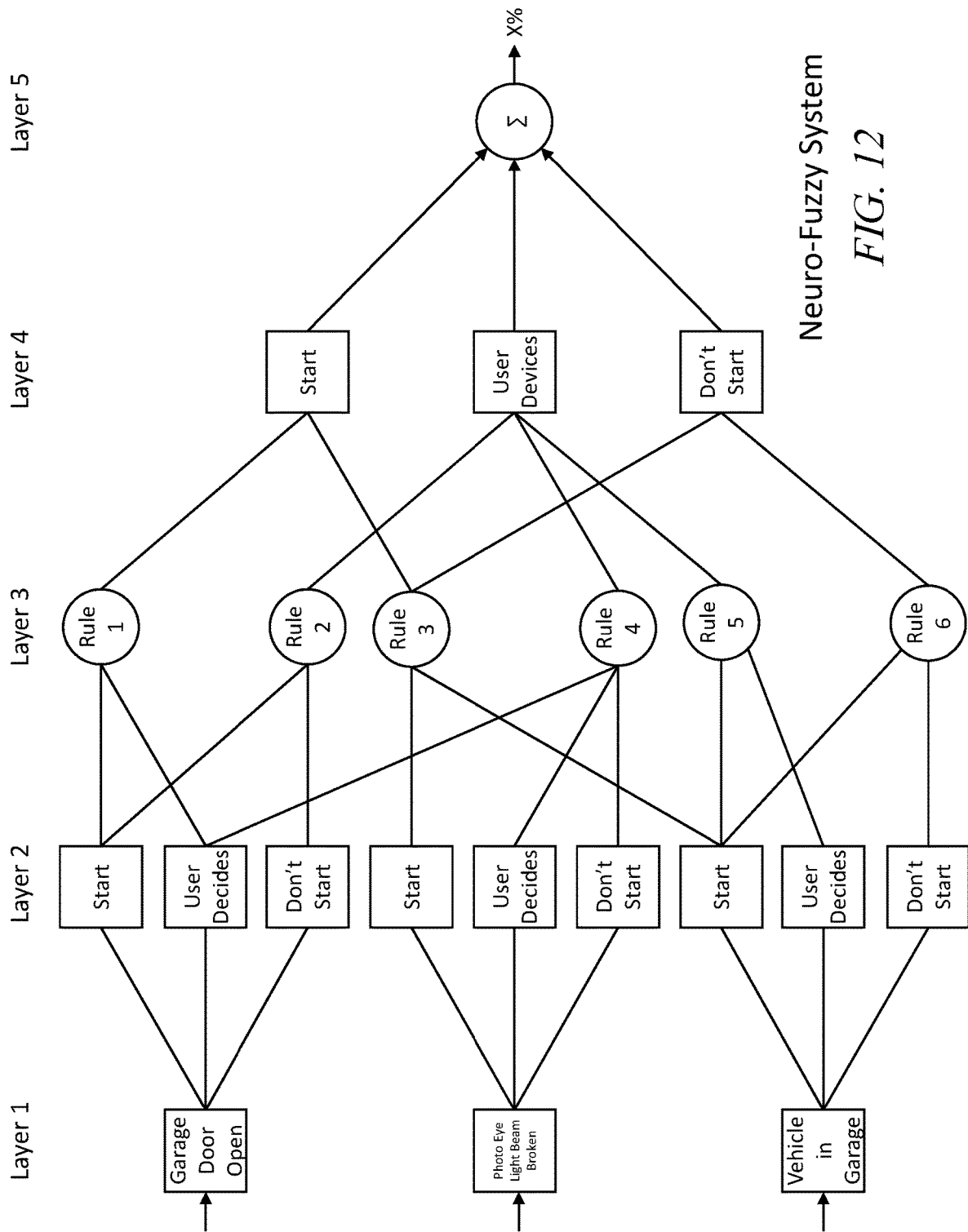
FIG. 12 illustrates the confidence algorithm embodied as a neuro-fuzzy system having a start process under control.
Figure 13:
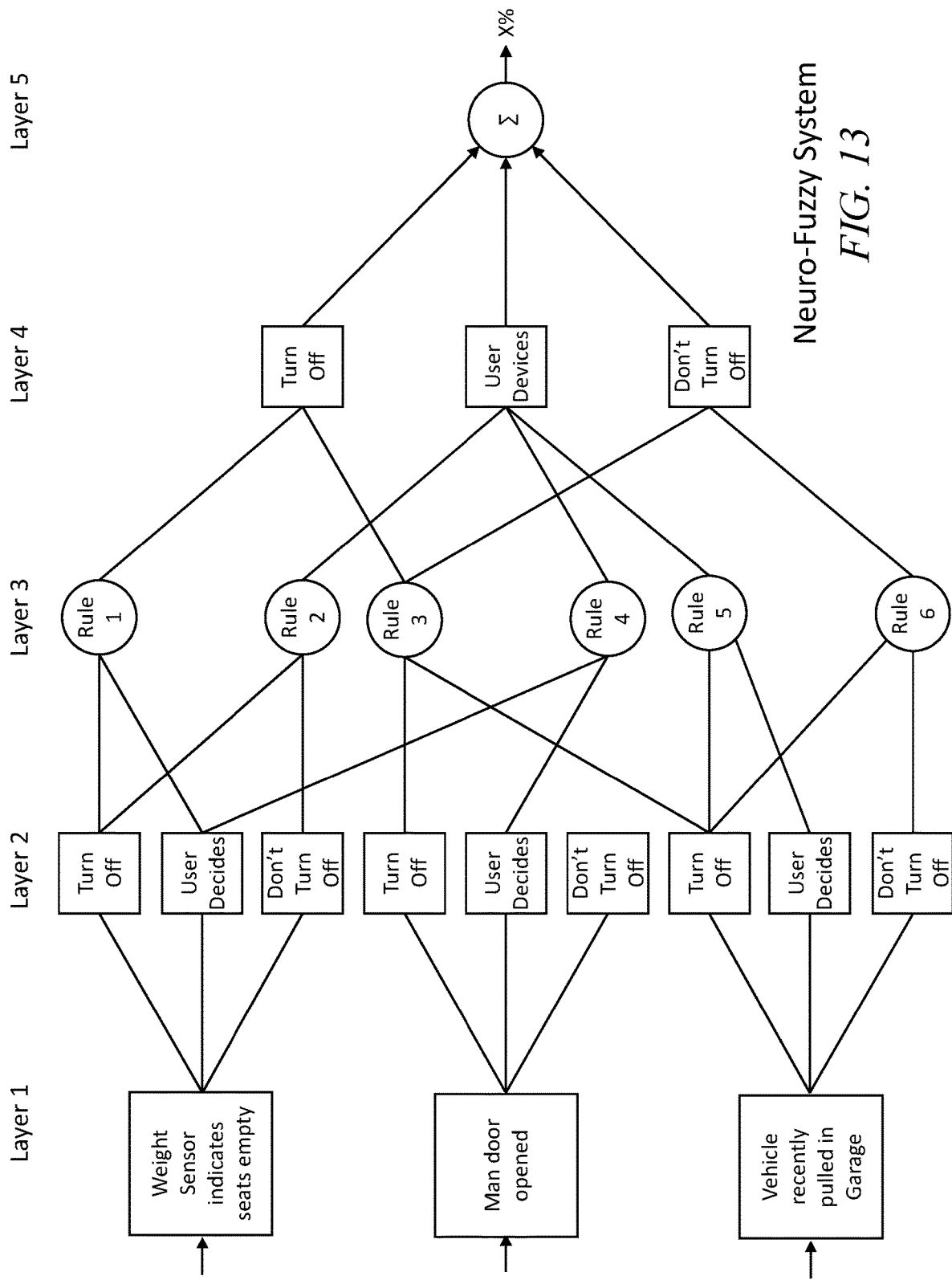
FIG. 13 illustrates the confidence algorithm embodied as a neuro-fuzzy system having a turn off process under control.

The embodiments of FIGS. 12 and 13 are only examples, and the systems may have more or less inputs, more or less rules, and more or less outputs. The inputs to the neuro-fuzzy systems of FIGS. 12 and 13 may be similar to the inputs to the neural expert system of FIGS. 8 and 9 except the one or more status parameters of the vehicle may be used to determine each input and the one or more status parameters may be normalized to a particular universe of discourse before being input into layer 1 as crisp values so that they may be fuzzified by reference to the universe of discourse in layer 2.

While there have been illustrated and described particular embodiments of the present invention, it will be appreciated that numerous changes and modifications will occur to those skilled in the art, and it is intended for the present invention to cover all those changes and modifications which fall within the scope of the appended claims.

The invention claimed is:

1. A system comprising:
a telematics service provider server computer configured to receive a vehicle status parameter of a vehicle, the telematics service provider server computer external to the vehicle;
an access control platform server computer external to the vehicle and operatively connected to the telematics service provider server computer, the access control platform server computer configured to receive a secured space status parameter of a secured space and operable to communicate with the telematics service provider server computer;
wherein at least one of the access control platform server computer and the telematics service provider server computer is configured to:
communicate the secured space status parameter, the vehicle status parameter, or both the secured space status parameter and the vehicle status parameter between the access control platform server computer and the telematics service provider server computer;
determine, based on the vehicle status parameter and the secured space status parameter, whether to change a state of the vehicle; and
communicate a command to the vehicle that causes the vehicle to change the state of the vehicle.

2. The system of claim 1, wherein to communicate the secured space status parameter, the vehicle status parameter, or both the secured space status parameter and the vehicle status parameter between the access control platform server computer and the telematics service provider server computer comprises the access control platform server computer communicating the secured space status parameter to the telematics service provider server computer;
wherein to determine whether to change the state of the vehicle comprises the telematics service provider server computer determining whether to change the state of the vehicle; and
wherein to communicate the command to the vehicle comprises the telematics service provider server computer communicating the command to the vehicle.

3. The system of claim 1, wherein to communicate the secured space status parameter, the vehicle status parameter, or both the secured space status parameter and the vehicle status parameter between the access control platform server computer and the telematics service provider server computer comprises the telematics service provider server computer communicating the vehicle status parameter to the access control platform server computer;
wherein to determine whether to change the state of the vehicle comprises the access control platform server computer determining whether to change the state of the vehicle; and
wherein to communicate the command to the vehicle comprises the access control platform server computer communicating the command to the vehicle.

4. The system of claim 1, wherein the secured space status parameter comprises a plurality of secured space status parameters, and wherein the vehicle status parameter comprises a plurality of vehicle status parameters.

5. The system of claim 1, wherein the vehicle status parameter comprises a vehicle ignition state; and
wherein to determine whether to change the state of the vehicle comprises determining whether to change the vehicle ignition state.

6. The system of claim 1, wherein the secured space status parameter is received from an access control platform associated with the secured space.

7. The system of claim 6, wherein the secured space status parameter includes a state of a garage door.

8. The system of claim 1, wherein to determine whether to change the state of the vehicle comprises determining whether to start the vehicle or shut off the vehicle.

9. The system of claim 1, wherein to determine whether to change the state of the vehicle is based at least in part on a confidence algorithm.

10. The system of claim 1, wherein to determine whether to change the state of the vehicle is based on a confidence algorithm indicating that the vehicle should start.

11. The system of claim 10, wherein the confidence algorithm outputs a probability value; and
wherein to determine whether to change the state of the vehicle is based at least in part on the probability value.

12. The system of claim 11, wherein to determine whether to change the state of the vehicle includes determining to change the state of the vehicle when the probability value is within a predetermined probability range.

13. The system of claim 11, wherein to determine whether to change the state of the vehicle includes determining to change the state of the vehicle upon the probability value being equal to or greater than a threshold probability value.

14. A method of controlling a state of a vehicle, the method comprising:
at a first server computer external to the vehicle:
receiving, via a network, one of a secured space status parameter and a vehicle status parameter of the vehicle, the secured space status parameter comprising a garage door state;
receiving, from a second server computer external to the vehicle and operable to communicate with the first server computer, the other of the secured space status parameter and the vehicle status parameter;
determining whether to change a state of the vehicle based on the secured space status parameter and the vehicle status parameter; and
communicating a command via the network to the vehicle to cause the vehicle to change the state of the vehicle.

15. The method of claim 14, wherein the network includes a wireless network.

16. The method of claim 14, wherein the vehicle status parameter comprises a plurality of vehicle status parameters, and wherein the secured space status parameter comprises a plurality of secured space status parameters.

17. The method of claim 14, wherein the vehicle status parameter comprises a vehicle ignition state; and wherein determining whether to change the state of the vehicle comprises determining whether to change the vehicle ignition state.

18. The method of claim 14, wherein the vehicle status parameter includes a location of the vehicle.

19. The method of claim 14, wherein the secured space status parameter comprises a status of a photo eye device.

20. The method of claim 14, wherein receiving the one of the secured space status parameter and the vehicle status parameter comprises receiving one or more vehicle status parameter from the vehicle.

21. The method of claim 14, wherein the second server computer comprises an access control platform server computer; and
wherein receiving the other of the secured space status parameter and the vehicle status parameter comprises receiving the secured space status parameter from the access control platform server computer.

22. A vehicle comprising:
a communication interface operable to communicate with a telematics service provider server computer external to the vehicle via a network;
an electronic control unit configured to detect a vehicle status parameter of the vehicle;
a processor operatively connected to the communication interface and the electronic control unit, the processor configured to:
cause the communication interface to communicate the vehicle status parameter to the telematics service provider server computer via the network; and
change a state of the vehicle between running and turned-off upon the communication interface receiving a command from the telematics service provider server computer to change the state of the vehicle, the command from the telematics service provider server computer responsive to a determination by the telematics service provider server computer to change the state of the vehicle based at least in part on the vehicle status parameter and a secured space status parameter the telematics service provider server computer received from an access control platform server computer external to the vehicle, the secured space status parameter including at least one of: a state of a movable barrier, an indication of whether a beam of a photo eye device has been interrupted, and an indication that the vehicle has been recognized by an image sensor.

23. The vehicle of claim 22, wherein the vehicle status parameter comprises a plurality of vehicle status parameters, and wherein the secured space status parameter comprises a plurality of secured space status parameters.

24. The vehicle of claim 22, wherein the vehicle status parameter comprises a vehicle ignition state, and wherein to change the state of the vehicle comprises to change the vehicle ignition state.

25. The vehicle of claim 22, wherein the communication interface is operable to receive a remote start signal from a device; and
wherein the processor is configured to cause the communication interface to communicate a remote start request to the telematics service provider server computer in response to the communication interface receiving the remote start signal.

26. The vehicle of claim 22, wherein to change the state of the vehicle includes changing the vehicle from turned-off to running upon the communication interface receiving the command from the telematics service provider server computer.

27. The vehicle of claim 22, wherein the vehicle status parameter includes a location of the vehicle.

28. The vehicle of claim 27, wherein the secured space status parameter includes the state of the movable barrier.

29. The vehicle of claim 22, wherein the secured space status parameter includes the state of the movable barrier;
wherein the movable barrier is a garage door and the state of the movable barrier includes whether the garage door is open or closed; and
wherein the vehicle status parameter includes whether the vehicle is within a garage associated with the garage door.

* * * * *